United States Patent

Gravel et al.

[11] Patent Number: 5,955,684
[45] Date of Patent: *Sep. 21, 1999

[54] MODULAR PROBE

[75] Inventors: James L. Gravel, Prior Lake, Minn.;
Steve D. Kruse, Roseville, Minn.;
Randall C. Olson, Prior Lake, Minn.

[73] Assignee: Rosemount Inc., Eden Prairie, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/779,321

[22] Filed: Jan. 6, 1997

[51] Int. Cl.$^6$ ..................................................... G01D 21/00
[52] U.S. Cl. ............................................................. 73/866.5
[58] Field of Search ....................... 73/866.5, 86, 863.85, 73/756, 304 R, 304 C; 374/208; 324/690, 696

[56] References Cited

U.S. PATENT DOCUMENTS

| | | | |
|---|---|---|---|
| 3,119,267 | 1/1964 | Bartky | 73/304 C |
| 4,198,110 | 4/1980 | Wetmore et al. | 339/89 R |
| 4,449,405 | 5/1984 | Franz et al. | 73/304 |
| 4,454,370 | 6/1984 | Voznick | 374/208 |
| 4,499,640 | 2/1985 | Brenton et al. | 73/304 C |
| 4,551,785 | 11/1985 | Kroner | 361/284 |
| 4,574,328 | 3/1986 | Maier | 361/284 |
| 4,628,392 | 12/1986 | Didier | 361/2 |
| 4,926,695 | 5/1990 | Kleven et al. | 73/861.24 |
| 5,391,839 | 2/1995 | Lang et al. | 174/65 R |
| 5,410,104 | 4/1995 | Gretz et al. | |
| 5,440,455 | 8/1995 | Rottmar | 361/809 |
| 5,481,197 | 1/1996 | Sanders | 73/304 C |

FOREIGN PATENT DOCUMENTS 33 37 481 A1  4/1985  Germany .
2045433    10/1980  United Kingdom ................... 374/208

OTHER PUBLICATIONS

"Is Your Equipment Designed and Installed Safely?", *InTech*, pp. 40–43, Jun. 1996.
National Electrical Code, Sections 500–503, 1996.
European Standard prEN 50284, pp. 1–16, dated Apr. 1997.
"Approval Standard for Explosionproof Electrical Equipment General Requirements", *Factory Mutual Research*, pp. 1–34, Jan. 1, 1992.

*Primary Examiner*—Robert Raevis
*Attorney, Agent, or Firm*—Westman, Champlin & Kelly P.A.

[57] ABSTRACT

A modular probe that is used for determining levels in a process material container, bins, pipes, using capacitance, micro impulse radar, or other types of signals, and which has a self contained pressure seal in the probe. The probe mounts to a connector that has an explosion proof barrier. The connector in turn supports a transmitter housing, which can be made explosion proof as well. The probe is coupled to the connector in a manner so that they can be easily separated and replaced without altering the explosion proof barrier. An independent seal on the probe itself permits the probe to be installed in a tank prior to the transmitter installation, and the transmitter may be uncoupled from the connector and replaced with a new transmitter without affecting the explosion proof portion of the assembly. The transmitter housing may also be removed or replaced from service without disassembly of the housing while the probe remains installed in a tank or other location undisturbed until the transmitter is replaced. Further, an environmental seal between the probe and the connector may be replaced without removing the transmitter housing from the connector so the explosion proof barrier for the transmitter housing remains effective.

14 Claims, 4 Drawing Sheets

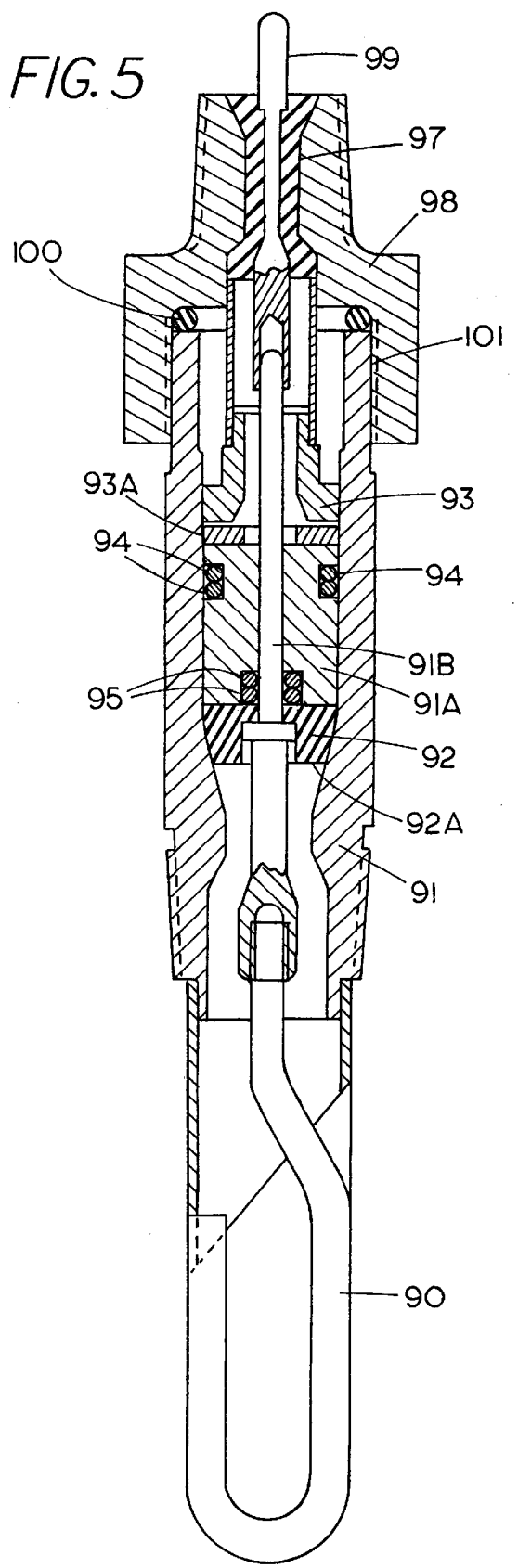

MODULAR PROBE

BACKGROUND OF THE INVENTION

The present invention relates to a modular probe and transmitter assembly having an explosion proof barrier between the probe and the interior of the transmitter housing.

Explosion proof transmitter housings and explosion proof enclosures for other process control equipment are known, but only having explosion proof housings does not complete the explosion proof installation when a probe forms part of the assembly. Both the housing or enclosure and the probe assembly itself must be approved for use in hazardous location installations. Direct mounted probes, that is, probes mounted directly to a housing, require a seal between the probe and the interior of the housing that is adequate to comply with the design requirements. In order to comply with the National Electric Code, an explosion proof barrier has to be located adjacent the housing and such a barrier also has to be provided for the probe.

Various attempts have been made to provide seals that will meet the necessary requirements for explosion proof probes under the National Electric Code. (NEC), but these are all difficult to service and handle and generally cannot be sold as "factory sealed", which is a great benefit in installation.

SUMMARY OF THE INVENTION

The present invention relates to a modular design of a probe and transmitter circuit housing where the probe is mounted directly to the housing and is used for sensing a parameter, such as sensing the level of a fluid or liquid in a tank. Usually the probe and transmitter housing assembly of the present invention are used in an industrial process where the level of some component in the process has to be monitored. The probe may be a capacitance probe, a micro impulse radar probe, or another type of sensor probe. In the present invention, a probe connector includes an explosion proof potting compound barrier in a passageway of a connector body. The probe has a self contained pressure seal in a seal assembly that couples to the connector. The probe may be installed in a location such as the tank wall, prior to transmitter installation. The transmitter, with the explosion proof barrier connector, is joined to the probe by threading or by other suitable connections known by people skilled in the art of connecting assemblies.

The seal body and probe assembly can be left in place in the tank and the transmitter section may be removed or replaced from the connector without disassembly of the transmitter housing. The probe can remain installed and undisturbed while the transmitter is replaced.

The transmitter housing thus can be separated from the probe and checked with independent measuring devices without exposing sensitive electronics to the environment of the installation or removing the probe from its installation.

The probe can also be serviced while installed. This can be done by removing the connector body from the probe and servicing the probe from the exterior of the tank. An environmental seal, which is an O-ring is used between the connector body and the seal body and it can be replaced without removing the transmitter housing from its connection to the explosion proof joint in the connector body.

The probe can be fabricated separately from the connector body having the explosion proof joint, and separately from the transmitter housing, allowing for modular manufacturing of the probe. A factory sealed assembly designation can be used with the transmitter housing, connector body and probe assembly, which then can be sold as a unit.

Various types of probes can be used. In particular, a micro impulse radar probe and a capacitive probe are shown herein. Other types of probes for different applications can be used as desired.

The components are easily manufactured, and provide an intrinsically safe system with an explosion proof coupling for use between a probe and a companion transmitter circuit housing.

BRIEF DESCRIPTION OF THE DRAWINGS

FIG. 5 is a schematic representation of a micro impulse radar probe assembly.

DETAILED DESCRIPTION OF THE PREFERRED EMBODIMENTS

Figure 1:
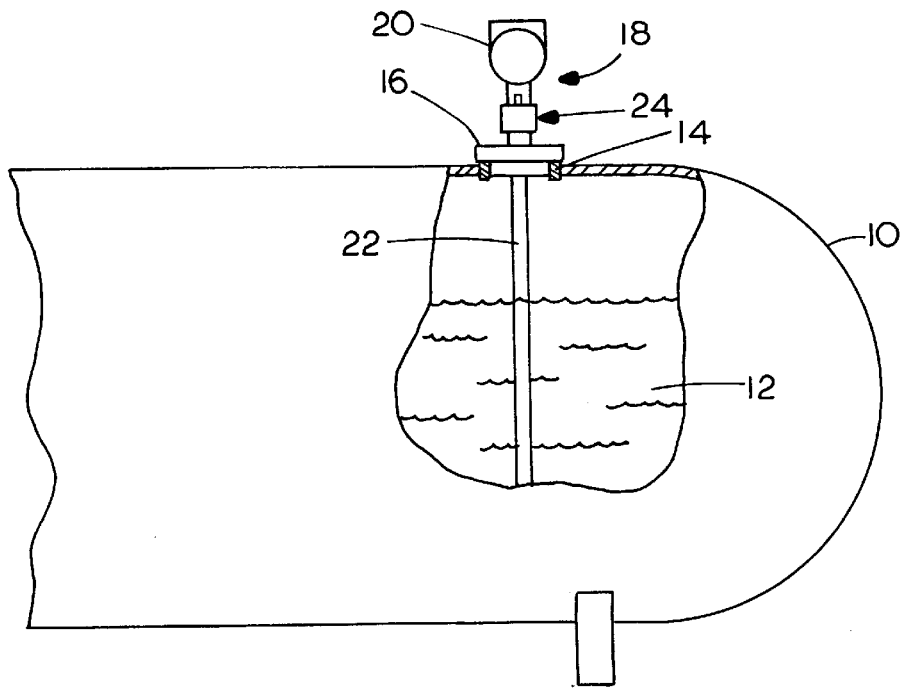
FIG. 1 is a schematic representation of a typical probe installation utilizing a coupling of the present invention.

In FIG. 1 a storage tank 10 used in a process control environment, contains a liquid 12, the level of which is to be determined or measured. A tank port has a collar 14 on which a flange 16 is mounted. A modular probe assembly made according to the present invention indicated generally at 18 is supported on the flange. The probe assembly 18 is connected to a transmitter housing 20 which is a standard transmitter including a circuit that receives signals from a probe (or antenna) 22, and causes the signals to be conditioned and sent to a remote location. The transmitter housing 20 is connected to the probe 22 on the interior of the tank 10 through a modular coupling 24 made according to the present invention, which is part of the probe assembly 18.

Figure 2:
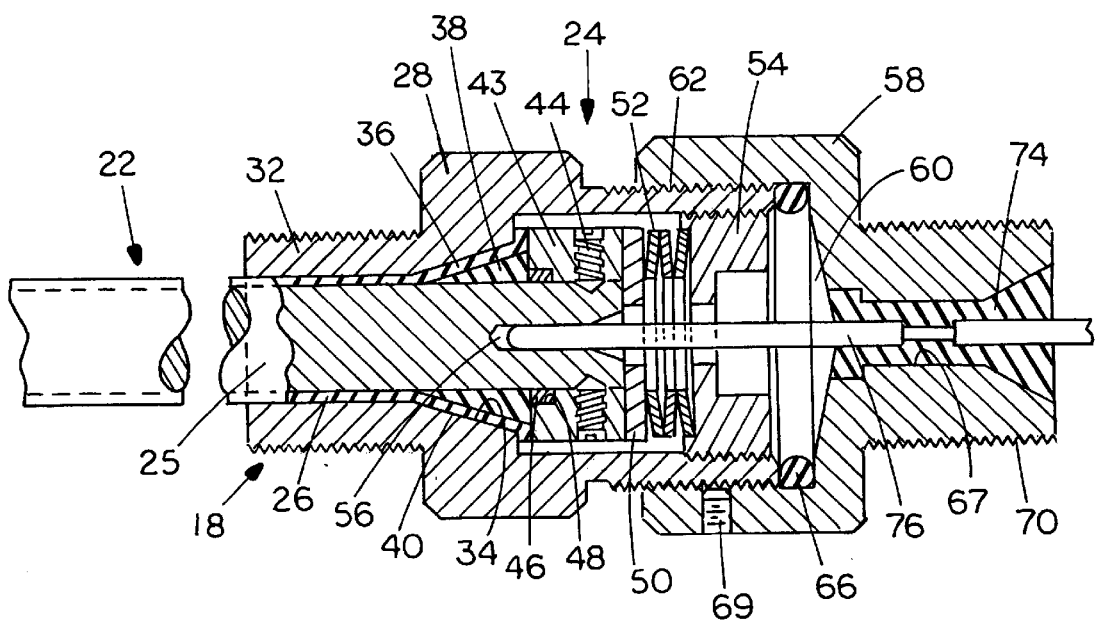
FIG. 2 is a schematic sectional view of a probe and coupling assembly made according to the present invention.
Figure 3:
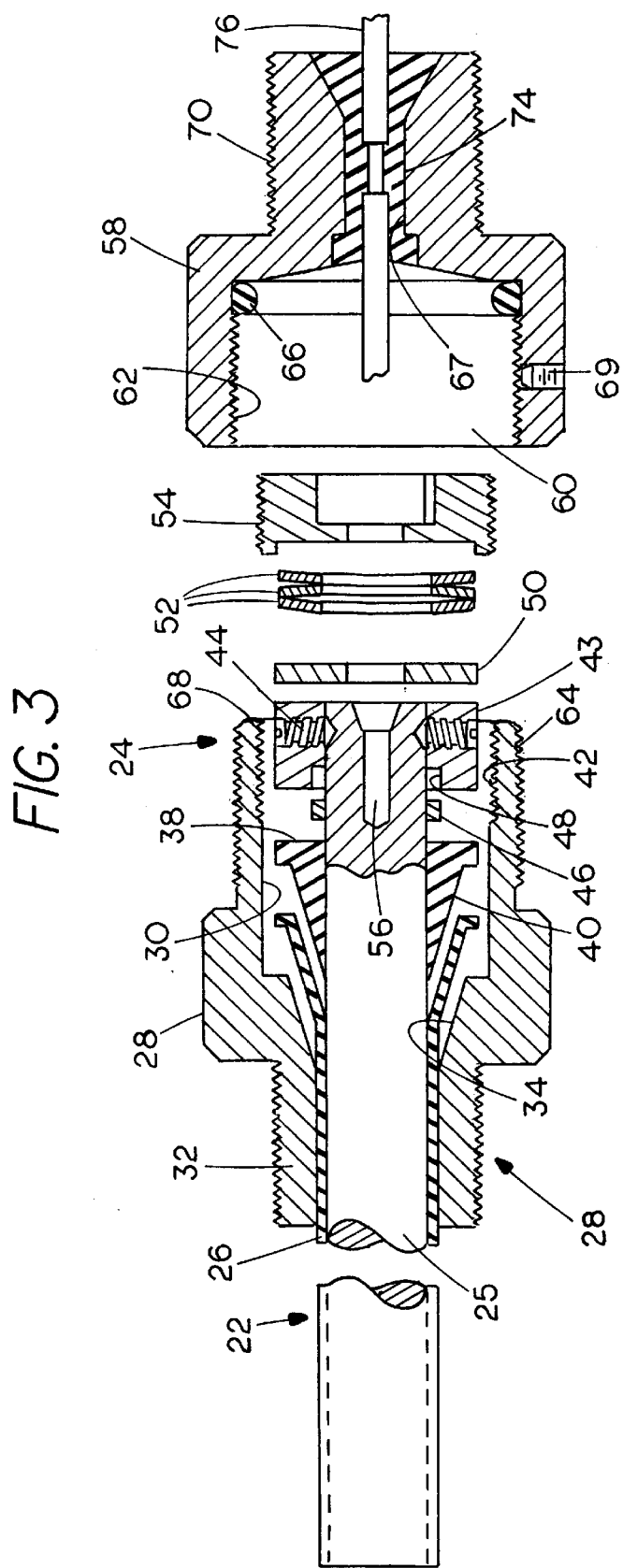
FIG. 3 is an exploded view of the device of FIG. 2.

The probe 22 as shown in FIGS. 2 and 3 as a capacitance probe, in the first form of the invention. The probe 22 forms one plate of a capacitance sensor. The second capacitive plate can be the tank wall or a reference probe. (Referring to FIGS. 2 and 3 in particular, the probe 22, as shown, is an elongated rod 25 covered with a sheath 26 of suitable material, such as Teflon (polytetrafluroethylene), which is an insulating material which makes the probe 22 usable with a conductive material.)

Other types of probes can be used such as the micro impulse radar probe or antenna, utilizing the same modular coupling 24. A Teflon sheath may be used to make the probe immune to corrosive materials.

The probe 22 with the insulating sleeve 26 in place, is slid through a chamber 30 in a seal body 28 forming part of modular coupler 24 through a close fitting bore, from a larger open end. An integral threaded neck portion 32 surround the bores for the probe and extends along the probe 22. The neck portion 32 threads into tank flange 16. A pipe nipple will work or the seal body can be welded into the flange. As can be seen interior chamber 30 of the seal body 28 has a tapered interior surface 32 at the end adjacent neck 34. The base end 36 of the sheath 26 is formed to that flared or tapered configuration. A ferrule 38 is slid over the probe 22 and fits within chamber 30. The ferrule 38 has a conical outer surface 40 that fits into the interior of tapered portion 36 of the insulating sheath 26. A lock ring 43 is slipped over the outer end of the rod 25 and fits within interior chamber 30. The lock ring 43 is fixed on the probe by set screws 44, at the outer end of the probe rod 25. An O-ring 46 is positioned between the ferrule 38 and the inner end of lock ring 43 and fits into a recess 48 in the end of lock ring 43.

The individual parts can be seen more clearly in FIG. 3. The probe 22 is slid into position in the seal body 28 and a nonconducting washer 50 is placed against the outer end of lock ring 43, and the probe 22, ferrule 38, lock ring 43 and washer 50 are slid as a unit into the chamber 30, with the probe extending out through the bore in neck 32.

The washer 50 is backed with a number of Belville type spring washers 52 and a plug 54 is then threaded into threads 42 on the interior of chamber 30 to force the probe 22 and ferrule 38 into the seal body 28 and securely mount it. A seal is formed around the probe 22 with the insulating sleeve 26, the ferrule 38 and the O-ring 46 which provides a gas tight seal around the probe core or rod 25.

The Belville washers provide a constant force on the seal 46, washer 50, lock ring 43 and ferrule 38 to maintain the seal under operating conditions. The plug 54 adjusted for preloading the seal surfaces through the Belville washers. The plug 54, ferrule 38 and the probe can be removed so the probe assembly may be serviced or checked at a later time without disturbing the installation of the seal body 28 on tank flange 16.

The rod 25 of the probe 22 has a connector pin socket 56 formed in the end thereof in the seal body 28, and the washer 50, the Belville springs 52 and the plug 54 all have openings that will permit a connector pin to pass therethrough for connection to the socket.

A threaded explosion barrier connector body 58 for the modular probe assembly 18 has an interior chamber 60 that is threaded as at 62 to receive the external threads 64 on the seal body 28, to make the assembly shown in FIG. 2. An environmental seal O-ring 66 is provided in the inner end of the chamber 60. The O-ring surrounds a central passageway 67 in a threaded neck 70 of the connector body 58. The seal body 28 is threaded so that the outer end edge 68 seats on the O-ring 66, and it will provide an adequate environmental seal by tightening it one-quarter to three-quarters of a turn beyond hand tight. This provides protection for the socket to pin connector interface on the probe, at socket 56, from the outside environment. The environmental joint formed between end 68 and O-ring 66 also acts as a vent system for the factory seal designation. This joint can be locked in place with a suitable set screw 69 passing through the wall of the connector body 58.

The threaded opening and set screw 68 and the threads 64 on seal body 28 form a vent to atmosphere.

The explosion proof seal is a potting material filling 74 in bore 67 in the neck portion 70 of the threaded connector 58. As shown, the central passageway 67 is filled with a potting material 74 that has a sufficient length along the axis of passageway 67 to a meet explosion proof requirements. The potting material also mounts a connector pin 76 in place. Material 74 forms a potted joint which is never changed, and can be manufactured to conform to all of the requirements of the explosion proof rating. The bore 67 and the pin 76 are both irregularly shaped in cross section to reduce the likelihood of blowing out the pin or potting material. The connector pin 76 is of size to fit into the socket 56 and form an electrical connection between the probe rod 25 and electronics in the transmitter 20.

Figure 4:
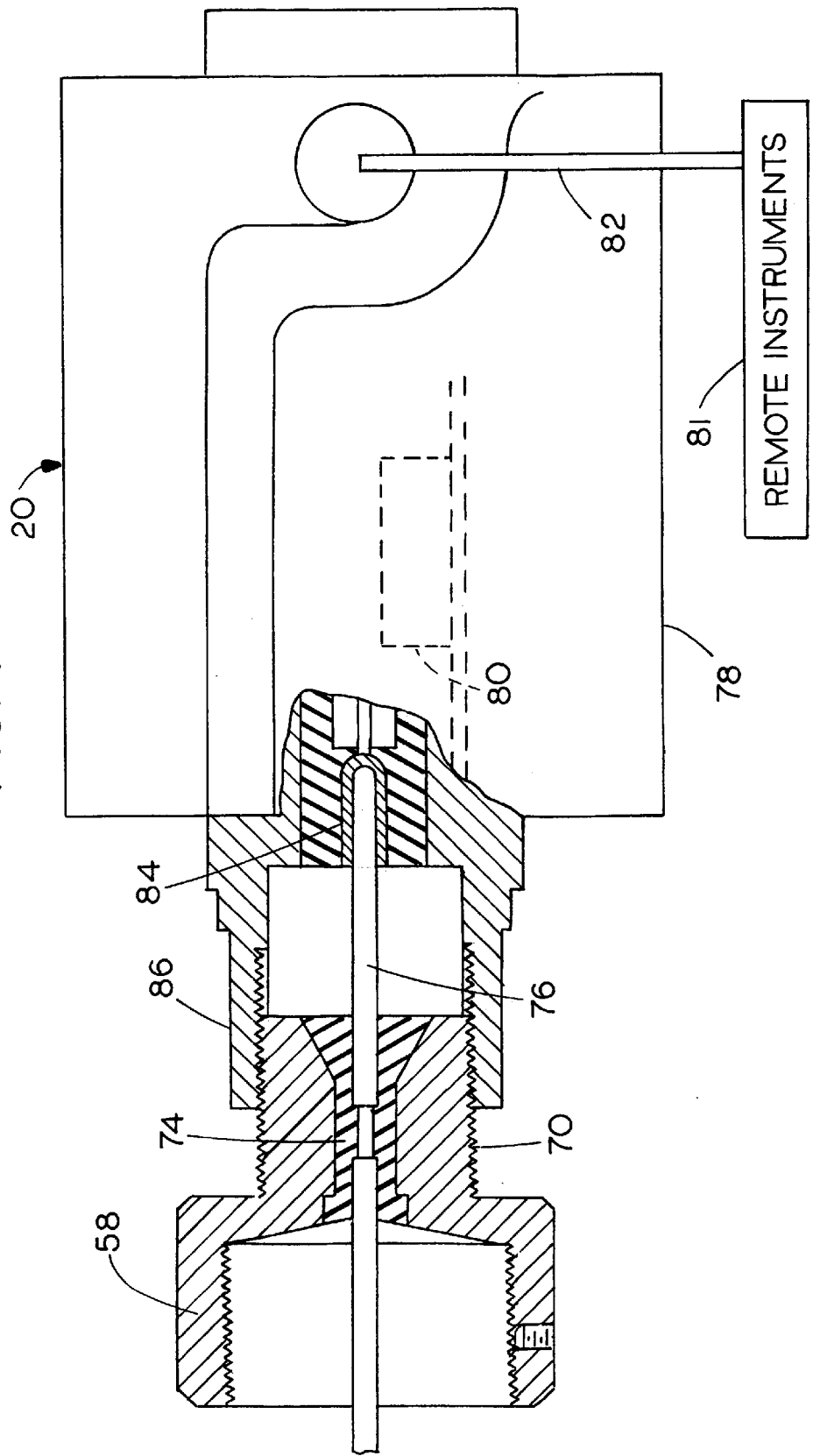
FIG. 4 is a sectional view of a typical transmitter housing having the connector of the present invention installed therein.

Referring specifically to FIG. 4, the transmitter 20 includes a housing 78 with electronics indicated generally at 80 maintained therein for receiving signals from the probe 22 and then transmitting the signals to a remote instrument 81 along cabling 82. The electronic circuitry 80 is connected to the probe through the pin 76 shown in FIG. 4. The pin 76 is received in a socket 84 mounted in the transmitter housing. The transmitter housing has a nipple 86 that is internally threaded, and it receives the end portions 70 of the threaded connector 58. The pin 76 is made of sufficient length so that it fits into the socket 84 and provides a good electrical connection. The explosion proof coupling thus is the threaded connector 58. The potting material 74 provides explosion proofing of the internal circuitry of the transmitter housing relative to the probe 22, which is mounted on connector body 58 and inserts into the process liquid or fluid.

With the explosion proof potting material 74 in the bore or passageway 67 of neck 70 of the threaded connector 58, it can be seen that the transmitter housing 78 can be unthreaded or unscrewed from the connector body 58 and removed for service of the electronic components or other components that are to be worked on without altering the explosion proof potting material 74. The transmitter housing 78 is made explosion proof, as is commonly done.

It also can be seen from FIGS. 2 and 3 that the connector body 58 can be left in place on the transmitter housing 78 and the threaded connector body 58 removed from the seal body 28, while the seal body is left in place on the probe 22. In other words the threaded connector body 58 can be completely removed from the seal body 28, without disturbing the O-ring 46 or the seal created by the ferrule 38 and the Teflon sheath sealing portion 36.

It should be noted that the Teflon sheath sealing portion 36 can be adjusted after a certain length of time by retightening the plug 54 after the initial assembly.

The probe 22 can be installed into the tank on the flange 16 by threading in the seal body 28. The threaded connector body 58 (with the explosion proof potting material seal) can be placed onto the transmitter housing 20 and then the transmitter housing threaded in place on the connector body. The entire unit (probe 22, seal body 28, connector body 58 and transmitter housing 20) can be assembled together for sale from the factory, and for installation if desired. Additionally, the transmitter housing 20 can be removed from the threaded connector body 58 while the threaded connector body 58 is retained on the seal body 28, without disturbing the seal provided by the O-ring 66, and thus protecting the internal connections of the pin 76 in the socket 56.

Normally the probe assembly 18 will be shipped separately from the transmitter, but they will be in a matched set so that they are compatible.

A micro impulse radar antenna or probe also may be mounted in an assembly that provides explosion proof features. Such a probe is shown schematically in FIG. 5. In this form, the micro impulse probe or antenna 90 can be held in a seal body 91. The seal body is threaded into or otherwise is fastened on a tank flange or other connector. A guide sleeve 91A serves to center a connector rod 91B and bears against a tapered Teflon seal 92 when a threaded plug 93 is threaded into the seal body, to compress the seal 92. The threaded plug 93 bears against a resilient washer 93A to load the sleeve 91A and Teflon seal 92 under a spring force. The Teflon seal 92 seats on a tapered interior surface 92A of the seal body 91.

The potting material forming an explosion proof joint or seal is shown at 97 and fills a passageway in a connector body 98. A pin 99 is potted in the potting material 97. The pin 99 couples to connector rod 91B and carries signals between the antenna or probe 90 and circuitry in a transmitter housing mounted on the connector body 98. The connector body 98 is threaded with threads 101 on the end of the seal body 91, as in the first form of the invention. An environmental O-ring seal 100 is placed between the end of the seal body 91 and the inner end of a chamber in the connector body 98. The threads 101 between the end of the seal body 91 and connector body 98 provide a vent when pressure on the interior of the seal body causes the O-ring 100 to release its seal. The intermediate connector body 98 permits removal of the transmitter or the seal body independently, to provide the features set out in the first form of the invention.

The term probe as used herein means an elongated sensor element having a portion held in a support body with a portion of the element protruding from the support body, whether the sensor element functions as an antenna or some other probe like member. A flat plate sensor inside a container, pipe, bin or tank can be supported by the seal body. The length of the potting material and the type of potting material used is selected according to known procedures and can be calculated to be greater than minimum lengths and minimum pressure ratings to meet explosion proof requirements.

Although the present invention has been described with reference to preferred embodiments, workers skilled in the art will recognize that changes may be made in form and detail without departing from the spirit and scope of the invention.

What is claimed is:

1. A modular probe assembly comprising a seal body, a probe for carrying electrical signals mounted in said seal body and sealed relative to an internal cavity of the seal body, a connector body removably, sealingly coupled to the seal body by mating threaded portions to permit removing the connector body from the seal body and having an internal passageway therethrough, a pin secured in the internal passageway, an explosion proof barrier material filling the internal passageway and securing the pin therein, the pin coupling to the probe for carrying the electrical signals when the connector body is coupled to the seal body, an environmental seal between the mated threaded portions for sealing the seal body relative to the connector body, said connector body maintaining the explosion proof barrier material in the internal passageway when removed from the seal body, and having a coupling section for coupling the connector body to a transmitter housing.

2. The probe assembly of claim 1, wherein said connector body has an internal chamber that threadably mounts over a portion of the seal body, the environmental seal abutting against the end of the seal body and a facing end of the chamber in the connector body when the connector body is in place on the seal body.

3. The probe assembly of claim 1, wherein said coupling section comprises a threaded end portion at an end of the connection body opposite from the seal body for coupling to a transmitter housing.

4. The probe assembly of claim 1, wherein said seal body has a chamber that receives an end portion of the probe with a portion of the probe protruding in a first direction from an opening in the seal body, a spring member in the chamber for urging the end portion of the probe in the first direction to engage a seal between the probe and the seal body, and a reaction plug mounted in the chamber for urging the spring member in the first direction to maintain a spring force on the seal between the probe and the seal body.

5. The probe assembly of claim 4, wherein said seal between the probe and the seal body comprises a tapered surface seal that engages an outer surface of the probe, with a tapered inner surface of the seal body.

6. The probe assembly of claim 5, wherein said reaction plug is threadably mounted in the seal body for engaging the spring member.

7. A modular sensor assembly for permitting servicing of components without altering an explosion proof connection between such components comprising a first member for providing signals indicating a condition to be measured to an output end of the first member, a support body supporting the first member and having a coupling portion at one end, a coupler threadably connected to the coupling portion, and an environmental seal between the coupler and the coupling portion comprising an elastic ring bearing against both the coupling portion and the coupler, said coupler having a passageway therethrough carrying a first electrical connector, said passageway being filled with a potting material to hold the first electrical connector in place and provide an electrical connection to the first member at a first end portion, and a second end portion of the first electrical connector extending from the coupler, the end of said coupler opposite from said first member being adapted to receive a housing for electronic components and the housing including a second electrical connector for connecting to the second end portion of the first electrical connector carried by said coupler.

8. The modular sensor assembly of claim 7, wherein said support body comprises a seal body and wherein said first member protrudes from the seal body, the coupling portion comprising a threaded portion, said seal body being threadably connected to said coupler.

9. The modular sensor assembly of claim 8, wherein said seal body has a chamber with a tapered inner surface at an end opposite from the threaded portion, a seal member surrounding said first member to engage both the first member and said tapered inner surface, and a spring adjustably loading said seal member to engage both said first member and said tapered inner surface.

10. The modular sensor assembly of claim 9, and a backing plug in the chamber for urging said spring against the seal member to urge the seal member toward said tapered surface.

11. The modular sensor assembly of claim 7, and a set screw for locking the threaded connection between said support body and said coupler.

12. The modular sensor assembly of claim 7, wherein said first electrical connector in said passageway of said coupler comprises a pin, said first member having a socket for receiving the first end portion of said pin, and the housing containing electrical circuits having a socket for receiving the second end portion of said pin, whereby said coupler may be independently, selectively removed from said first member and from the housing.

13. The modular sensor assembly of claim 8, wherein the environmental seal releases to vent excessive pressures in the support body.

14. A modular probe assembly comprising a probe for sensing a condition to be measured and providing signals to an output end of the probe, a seal body supporting the output end of the probe with portions of the probe protruding from the seal body into a chamber, a connector body threadably connected to the seal body at a location spaced from the probe, a ventable environmental seal between the connector body and the seal body for normally sealing an interface therebetween, the threadable connection between the connector body and the seal body providing a vent path for pressure when the environmental seal is subjected to a selected pressure in the chamber into which the portion of the probe protrudes, said connector body having a passageway therethrough carrying an electrical connector electrically coupled to the probe at a first end of the passageway, said passageway having a seal material therein to hold the electrical connector in place and provide an explosion proof barrier between the output end of the probe and a second end of the passageway, said connector body being removable from the support body while maintaining the explosion proof barrier formed by the seal material in the passageway, an end of said connector body opposite from said probe being adapted to receive and support a housing having electronic components connectable to the probe.

* * * * *